Jan. 13, 1959  J. C. CORBY, JR., ET AL  2,868,518
MIXER
Filed Jan. 8, 1957  3 Sheets-Sheet 1

INVENTORS
JOHN C. CORBY, JR.
DAVID C. TRIMBLE
BY *Cullen H. Frey*

ATTORNEY

Jan. 13, 1959 J. C. CORBY, JR., ET AL 2,868,518
MIXER
Filed Jan. 8, 1957 3 Sheets-Sheet 2
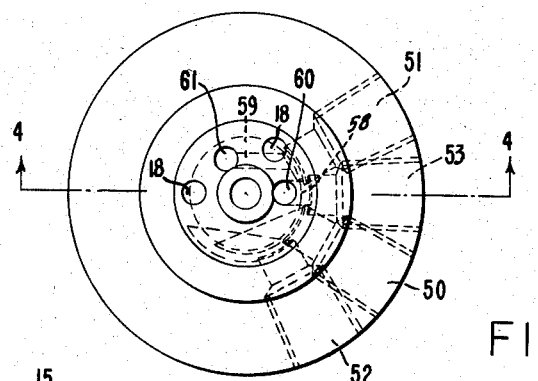
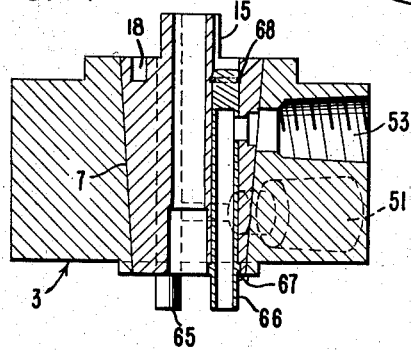
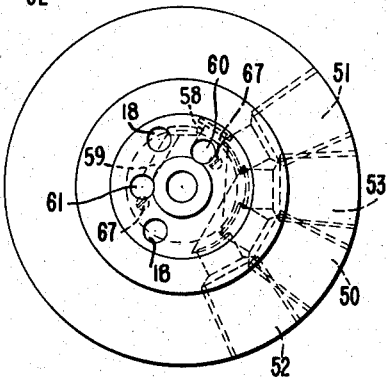
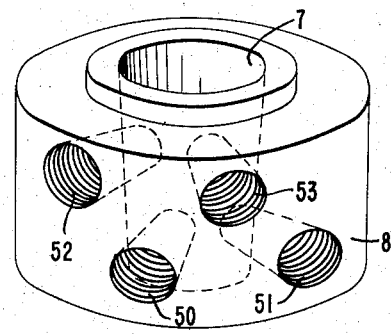
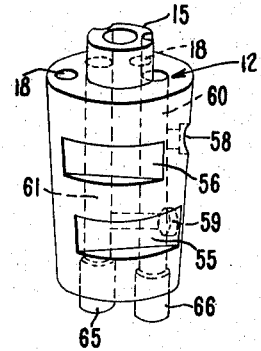
INVENTORS
JOHN C. CORBY, JR.
DAVID C. TRIMBLE
BY *Cullen H. Frey*
ATTORNEY Jan. 13, 1959   J. C. CORBY, JR., ET AL   2,868,518
MIXER
Filed Jan. 8, 1957   3 Sheets-Sheet 3

INVENTORS
JOHN C. CORBY, JR.
DAVID C. TRIMBLE
BY *Cullen L. Frey*
ATTORNEY

United States Patent Office 2,868,518
Patented Jan. 13, 1959

2,868,518

MIXER

John C. Corby, Jr., Waynesboro, Va., and David C. Trimble, Yorklyn, Del., assignors to E. I. du Pont de Nemours and Company, Wilmington, Del., a corporation of Delaware Application January 8, 1957, Serial No. 633,011

3 Claims. (Cl. 259—8)

This invention relates to mixers, and more particularly to mixers especially adapted for use in the preparation of cellular or foam products such as are produced by the reaction of diisocyanates and polyfunctional compounds containing reactive hydrogen.

In the preparation of isocyanate base foams or cellular materials, the polyfunctional compounds containing reactive hydrogens usually react quite rapidly with the polyisocyanates, and when further reacted with water, $CO_2$ is generated which causes expansion of the polymer so that under proper conditions a foam-like material is produced which in the presence of reaction accelerators can be made to set up readily in the form of cellular products. Mixing of the reactants of course should be as thorough as possible, and, because of the speed with which the components react, it is necessary to provide equipment which effects the mixing in the shortest possible time and in which residues of the reaction product are kept at a minimum. Existing production equipment and methods of producing this type of foam or cellular products have not been satisfactory for the filling of small molds or the production of small contoured foam articles such as automobile crash pads, arm rests, and specially shaped cushions for upholstery use. For these purposes a mixer is required which will not clog due to the repeated stopping and starting.

It is therefore an object of the present invention to provide a mixing apparatus particularly adapted for use in the preparation of isocyanate-base foams and which can be employed in the molding of small articles without undue clogging or cleaning. It is a more specific object of the invention to provide a mixer which can be used for extended periods of time in producing isocyanate base foams or other plastic material from two or more reactants, and which can be started and stopped at will to permit short runs without leaving any appreciable amount of the reactants to harden therein, and which requires no special cleaning with solvents after temporary stopping of the flow of the reactants.

In the accompanying drawing which forms a part of this application, a specific embodiment of this invention is disclosed.

Figure 2 is a plan view of the mixing valve showing the rotating valve plug in mixing position.

Figure 3 is a plan view of the mixing valve showing the rotating valve plug in position for recirculation of the reactants while the mixer is not being operated.

Figure 4 is a vertical section taken on the lines 4—4 of Figure 2, while Figures 5 and 6 are views of the mixer valve body and the rotating plug, respectively.

Figure 1:
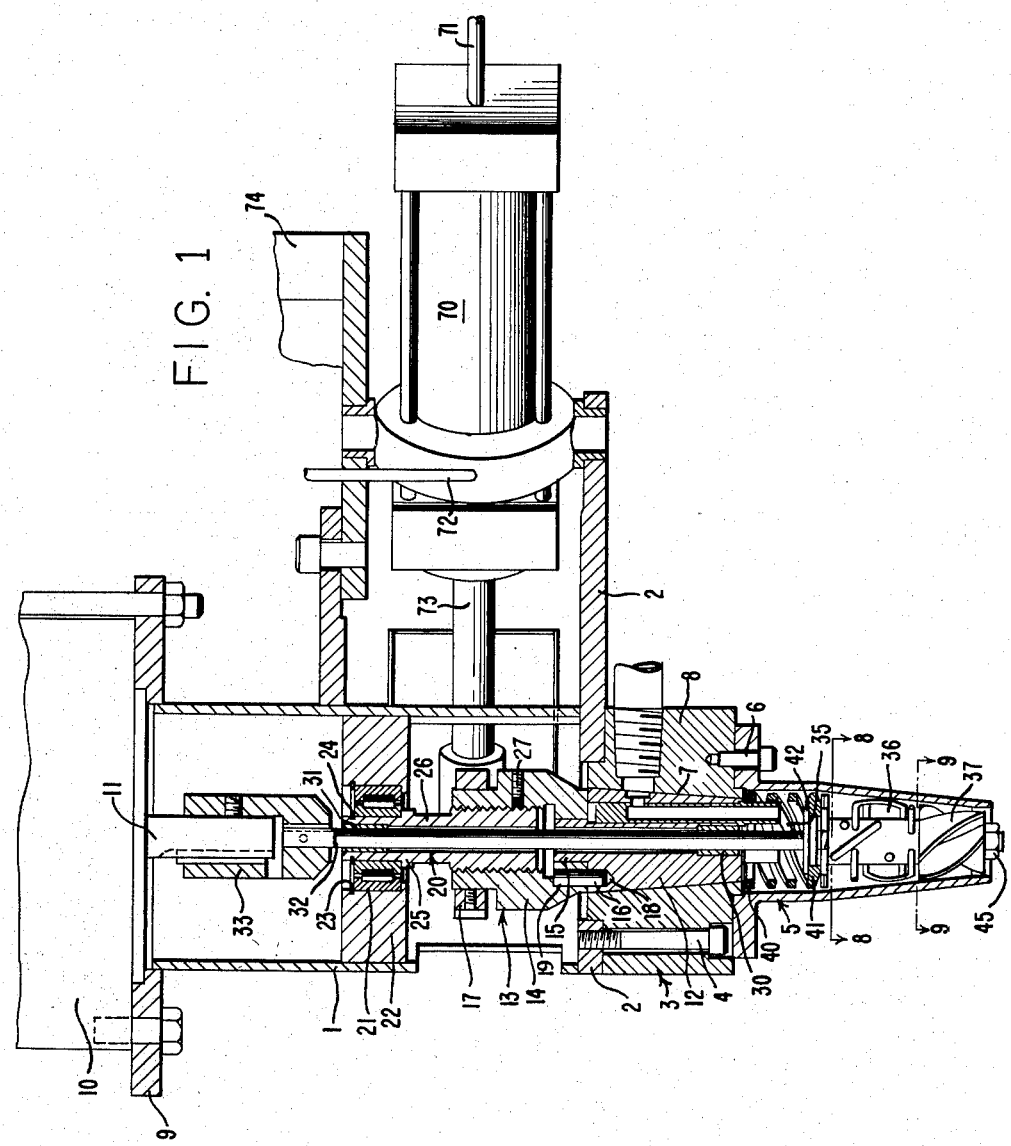
Figure 1 is a vertical section showing the general embodiment of the mixing valve, its operating mechanism and the rotary agitator in which the reactants are intimately mixed and expelled from the mixer.
Figure 8:
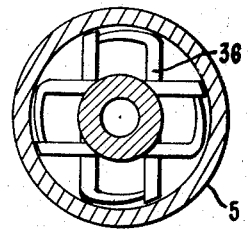
Figure 9:
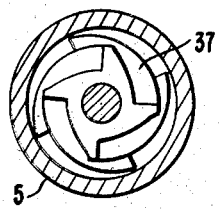
Figure 10:
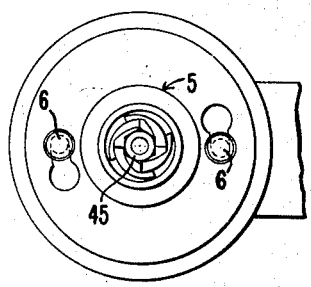

Figures 8 and 9 are detailed sections of the agitator mixing and discharging sections taken on the lines 8—8 and 9—9 of Figure 1; and Figure 10 is a bottom view of the main portion of the mixer.

In the form of the invention as illustrated in the accompanying drawings, the mixer is shown as comprising a cylindrical body 1, to the base 2 of which is attached the mixing valve 3 by means of bolts 4. At the lower end of the mixing valve is attached a mixing chamber 5, by means of bolts 6, which is concentrically arranged with the valve plug opening 7 in the valve block 8. The top end of the cylindrical body is provided with a motor base 9 to which an electric or other type of motor 10 may be attached so that the drive shaft 11 is positioned in alignment with the center of both the valve plug opening 7 and mixing chamber 5.

The valve plug opening 7, as illustrated in the drawings, is slightly conical in shape, into which the corresponding conically-shaped rotary valve plug 12 is fitted. The actuating mechanism 13 for the rotary valve plug comprises a cylindrical body member 14 which fits over the annular extension 15 of the valve plug and is fixed to rotate therewith by means of a pair of pins 16 which engage in holes 18 and 19 in the valve plug 12 and in the cylindrical body member 14 to prevent rotation between them. An actuating arm 17 is fixed to the top of the body of the actuating mechanism whereby the valve plug may be rotated in the valve body member.

The rotary valve plug 7 may be maintained in proper seating position in the valve block by means of a jack screw 20 which is threaded into the upper end of the body 14, the upper end of which jack screw is journaled in thrust bearing 21 which is fixed in the block 22 of the mixer body by means of spring rings 23 and 24. The jack screw 20 is provided with a shoulder 25 which fits against the thrust bearing to provide the necessary downward thrust to hold the rotary valve plug in place. The adjustment post 20 is provided with hexagonal neck portion 26 to permit adjustment of the threaded post in the body portion 14 so that it can be adjusted longitudinally. A set screw 27, provided at the inner end with a lead or other soft plug, maintains the adjustment between the adjustment post 20 and the body member 14.

Through the aligned openings in the rotary valve plug and its actuating mechanism is journaled, in bronze or other type bearings 30 and 31, an agitator shaft 32 which at the top end is fixed by means of a coupling mechanism 33 to the drive shaft 11 of the motor. The agitator which is fixed to the lower end of the agitator shaft 32 consists of three contiguous sections which may be referred to as the "basket" section 35, the mixing section 36, and the discharge section 37. The basket section, as shown in the drawing, comprises an open form of steel worm which is fixed to a ring 40 at the top and a base 41 at the bottom, whereby it may be clamped against the shoulder 42 in fixed relation on the agitator shaft 32.

The agitating arms in the mixing section 36 are preferably of the form disclosed in the drawings, being steel loops extending radially from the core member and preferably on a diagonal to the core axis so as to cause some downward movement of the material being forced therethrough. Since this section is primarily an agitating or mixing section, it is quite obvious that the agitating arms may be of any conventional design since the material is forced downward by the steel worm in the basket section 35. The discharge section 37 may be in the form of a spiral so as to forcibly discharge the material from the mixer. The three sections of the mixer are fixed to the agitator shaft 32 by means of the nut 45 which clamps them tightly together on the shaft against the shoulder 42. The steel worm in the basket section, the loops in the mixing section and the spiral scroll in the discharge section all fit relatively closely to the inner wall of the mixing chamber.

As illustrated in more detail in Figures 2 to 6, inclusive, the mixing valve 3 comprises block 8 which has two sets of tapped holes 50—51 and 52—53 extending radially into the valve plug opening 7, each set being in a different plane. The set 50—51 is arranged to cooperate with a slot 55 in a rotating valve plug as shown in Figure 6, and the second set 52—53 is arranged to cooperate with the slot 56 so that when the valve plug is turned to one position the slots 55 and 56 register with the inner ends of each pair of openings, respectively, and in this position the materials entering the holes 51 and 53 are circulated in and out of the valve. As illustrated in the figures on sheet 2 of the drawing, the rotary valve plug also contains two radial openings 58 and 59 which connect with downwardly leading holes 60 and 61 in the plug so that when the rotary valve plug is turned in its seat in the block 8, liquids entering the holes 51 and 53 simultaneously pass inwardly through the openings 58 and 59 and downwardly to the mixing chamber. The holes are preferably arranged so that the rotary valve plug is moved through an arc of 60° or less from the recirculation position to the discharge position to facilitate quick starting and stopping of the flow of the reactants.

As more particularly illustrated in Figures 1, 4 and 6, removable jet tubes 65 and 66 are provided to fit in the holes 60 and 61 and are held therein by set screws 67. Jet tubes may be provided with openings of varying diameters so that the amount of liquids which may pass into the mixing chamber may be controlled by selecting the proper tubes. Furthermore, the jet tubes may also be rotated in the holes 60 and 61 to throttle the amount of liquids coming in from the openings 51 and 53 to provide a uniform rate of flow as the plug valve is opened or closed during the operation of the machine. Packing rings 68 at the top of the jet tubes effectively seal them in the openings. As illustrated in the drawing, these jet tubes extend below the bottom of the valve plug and into the basket section of the agitator. This consruction tends to prevent the accumulation of the materials to be reacted on the end of the valve plug, which in many cases would ultimately cause binding of the plug in the valve block.

Figure 7:
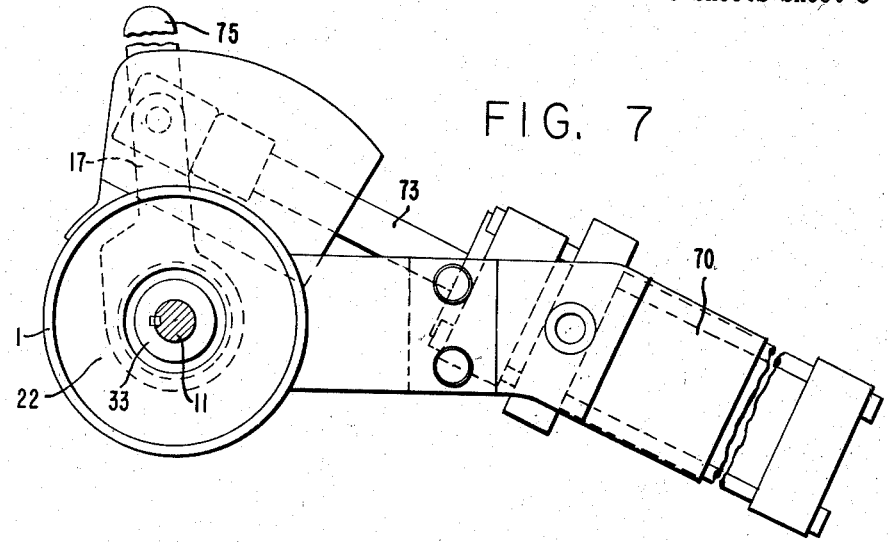
Figure 7 is a plan view of the mixer with the motor removed.

As more particularly illustrated in Figures 1 and 7, an air cylinder 70 with intakes and outlets 71 and 72 provides the motive power necessary to operate the mixing valve 3. The piston 73 from the air chamber is connected with the actuating arm 17, as more particularly illustrated in Figure 7. To operate the air cylinder, the leads 71 and 72 may be connected to a conventional 4-way air valve which diverts the air to either end of the air cylinder as required for actuation of the valve. As illustrated in Figure 7, the actuating arm 17, however, may have an extended handle 75 whereby the valve may be operated manually.

It will be obvious to those skilled in the art that the dual 3-way mixing valve 3 may take various forms. The valve is called a dual valve because it controls the flow of two different liquids. The rotating valve plug may be tapered, as illustrated in the drawings, or may be entirely cylindrical, and in either form lubricating channels and openings may be provided in the valve plug and/or valve block to prevent freezing of the valve in the block.

The mixing chamber 5 is preferably funnel- or cone-shaped to prevent excessive quantities of air from being whipped into the mixture, and is fastened to the valve block through key-hole slot arrangements, as illustrated in Figure 10, to facilitate removal and cleaning.

The agitator in the form illustrated in the drawings has three distinct sections, each of which as described above performs a particular function. The basket section 35 tends to rapidly force the materials through the mixing section 36, while the agitating arms in 36 are arranged to make a homogeneous blend of the materials being mixed with a minimum of pumping action, while the third spiral fluted section expels the mixture rapidly into the form or mold to be filled. It will be obvious to those skilled in the art that these three sections of the agitator may take various forms to accomplish substantially the same results. While a mixer of the type illustrated having three sections has been found to give excellent mixing and clearing of the mixing chamber as the materials react, it has also been found that with materials that do not react too rapidly the mixer may consist of only the top and bottom sections, particularly where the materials to be mixed are not excessively viscous prior to the final reaction. In cases where the reaction mixture becomes very viscous, heat is often generated in the mixer and this may be dissipated by any conventional means such as by the addition of fins, or blasts of air directed on the outer wall of the mixer.

The following example illustrates the operation of the mixer of this invention as applied to a particular polyurethane composition. In this example the parts used are by weight unless otherwise specified.

*Example*

3000 parts of dry polytetramethylene ether glycol of molecular weight 3000 is mixed with 348 parts of a mixture of 80% toluene-2,4-diisocyanate and 20% toluene-2,6-diisocyanate and the mass is heated and stirred at 60° C. for 2 hours under a nitrogen atmosphere. Then an additional 35 parts of the diisocyanate mixture is added and heating is continued for 2 more hours at 140° C. The reaction mass is cooled to room temperature. 131 parts of the toluene-2,4- and toluene-2,6-diisocyanate mixture is stirred in. This "prepolymer" mixture analyzes for 9.5% free —NCO groups.

For the formation of a cellular product using the apparatus described above and illustrated in the drawings, two solutions are prepared as follows:

*Solution A—(polymer)*

94.8 parts of the "prepolymer" prepared as described above 5.2 parts of a toluene diisocyanate mixture consisting of 80% toluene-2,4-diisocyanate/20% toluene-2,6-diisocyanate 10.0 parts of di-decylphthalate 0.5 parts of polydimethylsiloxane of 50 centistokes viscosity.

These components are thoroughly mixed together in a dry atmosphere to form a homogeneous solution.

*Solution B—(catalyst)*

3.1 parts of water
1.5 parts of N-methylmorpholine
thoroughly mixed to a uniform solution.

These two mixes are placed in two separate supply tanks, each of which is connected through variable speed gear pumps or other readily controlled pumps, to the mixing valve, illustrated in the accompanying drawings, each through one of the sets of openings 50—51 and 52—53. The valve in the mixer is set in the recycle position and the flows of the two solutions are adjusted to a total weight of 8 pounds per minute in the ratio of 96.0 parts of Solution A to 4.0 parts of Solution B.

The valve is then turned to the through position and approximately 1.05 pounds of the foam mixture is discharged in approximately 8 seconds into a cushion mold having a cavity 15 x 15 x 3 inches, and then the valve is returned to the recycle position. A lid bearing 49 pins of ¾ inch diameter and 2¼ inches long uniformly spaced thereon, is placed on the mold. Four such cushion molds are filled. The molds are placed in an oven and cured for 3 hours at 120° C.

After standing at room temperature for a day, the resulting cored cushions have an average apparent density of 2.45 pounds per cubic foot, the cellular product having an average density of 3.3 pounds per cubic foot. The cushions are quite elastomeric in character. By the Rubber Manufacturers' Association Test on the four cushions, an average of 33 pounds load per 50 square inches (35, 32, 31, 33) is required to show a 25% deflection in thickness.

The mixer employed in carrying out the above example has a mixing chamber with a bore of approximately 1.5 inches at the top and approximately 0.9 inch at the outlet. The agitator is rotated at a speed of approximately 450 R. P. M. to give a peripheral speed of the agitator of approximately 1310 feet per minute in the basket section, and a speed of approximately 475 feet per minute at the outlet. For proper agitation, the peripheral speed of the agitator in the mixer of the type illustrated should be from 700 to 2500 feet per minute and preferably within the range of from 1000 to 1500 feet per minute.

The pressures at which the polymer and the catalyst are introduced into the mixing chamber will be sufficient to provide a constant feed through the mixing valve into the mixing chamber and will of course depend on the degree of the viscosity of the materials being mixed. Only sufficient pressure need be employed in each line to provide continuous flow into the mixing chamber. In the preparation of cellular products by the reaction of diisocyanates and polyfunctional compounds containing reactive hydrogen, it will be obvious that the amount of catalyst may be varied within wide limits. In some cases very small amounts of catalyst are required and therefore the pressure at which it is introduced will ordinarily be quite small. In the use of the basket section on the agitator as illustrated in the drawings, the pressure in that section will be substantially atmospheric or even subatmospheric due to the pumping action of this section. This will of course prevent any return of the polymer solution through the catalyst line which may be operated at a pressure lower than that required on the polymer line. Because of the relatively high speed agitator operating in the mixing chamber of substantially the same size as the agitator itself, very efficient mixing is effected in a fraction of a second.

It is often desirable to employ a flow meter in the catalyst line so that accurate control of the volume of ingredients may be maintained.

It will be obvious that in a mixer of the type illustrated the agitator shaft may be operated by an electric, air or other type motor. The mixer as described provides a hold-up time in the mixing chamber of only a fraction of a second, and due to the construction of the agitator the mixture as fast as formed is thrown downwardly to clear the chamber and prevent back pressure. The taper of the plug and mixer are of course not critical, and may be varied as desired.

It will be obvious to those skilled in the art that a mixer of the type described is suitable for the preparation of any polymer mixture which must be mixed rapidly and uniformly and expelled from the machine to prevent gumming up of the apparatus when it is stopped even for short periods of time, as required in the filling of small molds. In a mixer of the type described and having a 1½ inch diameter opening in the top of the mixing chamber, flow rates of from 2 to 15 pounds per minute may be employed successfully.

It is of course understood that, in mixing polymers of the type more particularly described in the above example, when the mixer is stopped for indefinite periods of time it is desirable to clean all the parts exposed to the liquid polymer, by flushing immediately with a solvent for the polymer. To assist in the cleaning, particularly of the 3-stage mixing blade, it is advantageous to coat both the mixing plate and the inner surfaces of the mixing chamber with a silicone mold lubricant of the type currently available on the market, although this of course is not an essential to the efficient operation of the machine.

We claim:

1. A mixer of the type described, comprising a dual three-way mixing valve consisting of a body member and a rotary valve plug provided with cooperating inlets and passages through which two liquids may be separately circulated when the valve plug is turned in one position; outlet openings extending axially in the valve plug, the inlets of which are movable into cooperating position with the inlet for each of said liquids; a mixing chamber attached to said mixing valve in axial alignment with the rotary valve plug, the outlets in said valve plug opening into the mixing chamber; a rotary mixer arranged in said mixing chamber for simultaneously rapidly moving the material emitted from said outlet openings through the mixing chamber and mixing it in the mixing chamber; means for rotating the valve plug in the valve body whereby the liquids may be circulated or expelled into the mixing chamber; and means for rapidly rotating the mixer in the mixing chamber.

2. A mixer of the type described, comprising a dual three-way mixing valve consisting of a body member and a rotary valve plug provided with cooperating inlets and passages through which two liquids may be separately circulated when the valve plug is turned in one position; outlet openings extending axially in the valve plug, the inlets of which are movable into cooperating position with the inlet for each of said liquids; a mixing chamber in axial alignment with the rotary valve plug attached to said mixing valve at one end and having a discharge opening at the other end, the outlets in said valve plug extending into the mixing chamber; a rotary mixer arranged in said mixing chamber comprising a section for rapidly moving the material emitted from said outlets through the mixing chamber; means on said rotary agitator for effectively mixing and expelling the mixed material from the discharge opening end of the mixing chamber; means for rotating the valve plug in the valve body whereby the liquids may be circulated or expelled into the mixing chamber; and means for rapidly rotating the mixer in the mixing chamber.

3. A mixer of the type described, comprising a dual three-way mixing valve consisting of a body member and a rotary valve plug provided with cooperating inlets and passages through which two liquids may be separately circulated when the valve plug is turned in one position; outlet openings extending axially in the valve plug, the inlets of which are movable into cooperating position with the inlet for each of said liquids; a mixing chamber in axial alignment with the rotary valve plug attached to said mixing valve at one end and having a discharge opening at the other end, the outlets in said valve plug being provided with jet tubes which extend into the mixing chamber; a rotary mixer arranged in said mixing chamber comprising a section for rapidly moving the material emitted from said outlets through the mixing chamber; a second section on said rotary agitator for effectively mixing the material; and a third section on said mixer for expelling the mixed material from the discharge opening end of the mixing chamber; means for rotating the valve plug in the valve body whereby the liquids may be circulated or expelled into the mixing chamber; and means for rapidly rotating the mixer in the mixing chamber.

References Cited in the file of this patent

UNITED STATES PATENTS 2,736,534     Atkins _____ Feb. 28, 1956

FOREIGN PATENTS 81,541     Holland _____ Apr. 17, 1956